United States Patent [19]

Gimenez

[11] 4,099,298

[45] Jul. 11, 1978

[54] SELF TIGHTENING ELASTIC CLAMP, PARTICULARLY A HOSE CLAMP

[76] Inventor: Aurelio Helde Gimenez, Rua Araguaia n. 674, Bairro de Caninde Sao Paulo, S.P., Brazil

[21] Appl. No.: 778,716

[22] Filed: Mar. 17, 1977

[51] Int. Cl.² ............................................. F16L 33/20
[52] U.S. Cl. ......................................................... 24/27
[58] Field of Search ............................................ 24/27

[56] References Cited

U.S. PATENT DOCUMENTS 3,131,444  5/1967  Manning .................................. 24/27

*Primary Examiner*—Werner H. Schroeder
*Attorney, Agent, or Firm*—Michael J. Striker

[57] ABSTRACT

A self-tightening elastic clamp is provided for firmly holding a plurality of pieces together, comprising, in combination, an elastically deformable metal helix having a predetermined shape and size and having a spring back force maintaining the predetermined shape and size in the absence of deforming forces of greater strength than the springback force, and clamp opening portions connected to the helix and operative when the helix is to be fitted over the pieces for deforming the helix through straining by transmitting compressive stress from the fingers of a user.

11 Claims, 5 Drawing Figures

SELF TIGHTENING ELASTIC CLAMP, PARTICULARLY A HOSE CLAMP

BACKGROUND OF THE INVENTION

This invention relates to new and useful improvements in clamps firmly holding two or more objects together, and in particular to hose clamps.

A conventional hose clamp usually requires such complementary accessories as screws and nuts to secure the clamp in position. Subsequent adjustment of the clamp then requires adjustment of, for example, the screws and nuts. Adjustment of these accessories is an inconvenience since a screw driver or some other tool must be used. Furthermore, the clamp may become jammed or may be weakened as the screws and other movable parts rust.

SUMMARY OF THE INVENTION

This invention relates to a self-adjusting elastic clamp for firmly holding two or more articles together, particularly a hose clamp.

The principal object of the present invention is to overcome all of the above-mentioned disadvantages by providing a clamp dispensing with the complementary accessories such as screws and nuts while clamping tubes and hoses in such a manner as to prevent leakage of liquids, oil, gases and the like.

The inventive clamp may comprise a band or wire. The band or wire can be made of stainless steel, carbon steel or the like.

The band or wire is shaped so as to form two or more turns. The cross section of the turns may be round, oval, or of any other shape. The turns are side by side, giving an appearance of a spiral spring. The diameter of the turns is adapted to the size of the pieces to be clamped.

The two ends of the wire are, relative to the turns, bent outwardly so that two ears or levers are formed. When these levers are pressed together by the fingers of a user, the diameters of the turns are increased. By this easy manual operation, the invented clamp can be fitted over a hose or tube. Upon cessation of this pressure on the levers, the invented clamp resiliently springs back to its original diameter, thus making possible a firm clamping of the hose.

This clamp, then, is an easily produced device having a low cost while having great utility and efficiency.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
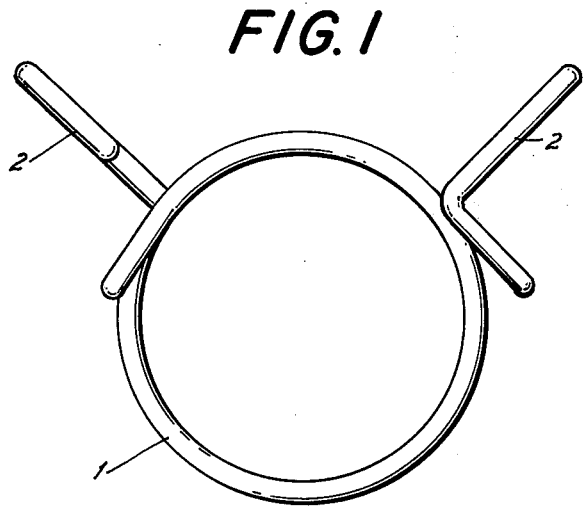
FIG. 1 is an enlarged front view of the invented self-adjusting clamp.
Figure 2:
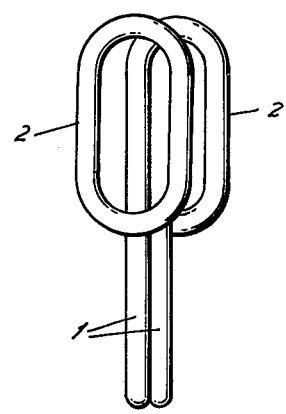
FIG. 2 is a lateral profile of the elastic clamp.
Figure 3:
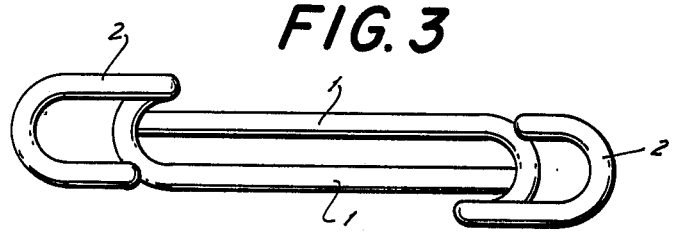
FIG. 3 is a top view of the invented clamp.

FIG. 1 shows a circular clamp with its outwardly directed pair of levers 2. FIG. 2 shows that the clamp 1 comprises two adjacent turns of a wire or band. FIGS. 2 and 3 illustrate a pair of levers 2, each projecting from a respective turn.

The circular clamp 1 is made by wrapping or shaping a wire of stainless or carbon steel such that two or more adjacent turns are formed. The two ends of the wire are then bent outwardly relative to the turns, thereby forming levers 2. The levers 2 may be further bent into lifeboat-shaped or hook-shaped configurations as illustrated respectively by FIGS. 2 and 3.

The hook-shaped configuration preferably has four successively connected sections including a first section being axially inwardly bent, a second section being radially outwardly bent, a third section being axially outwardly bent and a fourth section being radially inwardly bent and being substantially parallel to said second section.

The clamp 1 has the shape of a helix and has the resilient property of a helical spring.

Figures 4, 5:
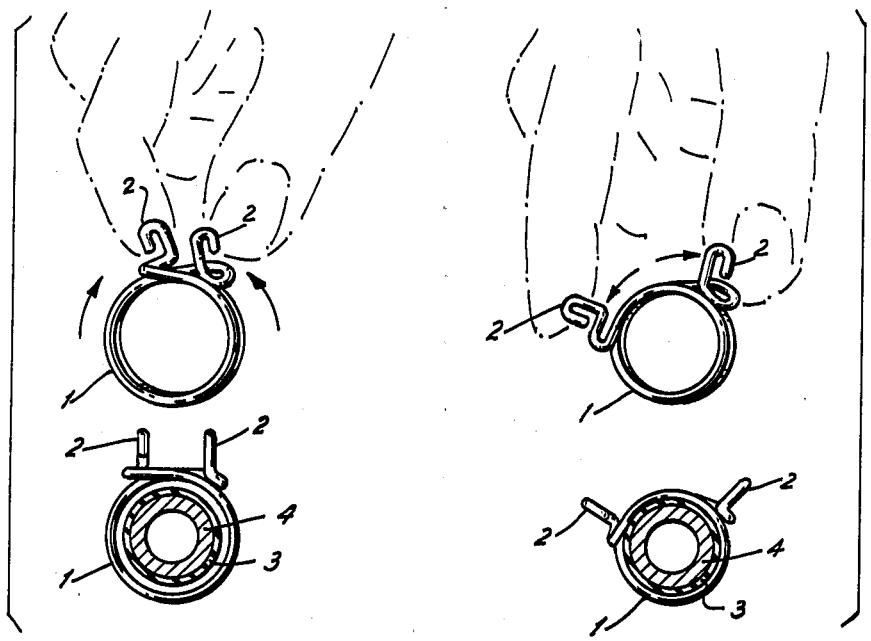
FIGS. 4 and 5 are perspective views illustrating the operation of the invented clamp.

As shown in FIG. 4, the levers are pressed towards each other by force of a thumb and an index finger on the respective levers 2. As a consequence of this pressure against the levers 2, the diameter of the clamp 1 is increased. The clamp can then be fitted over the end of a tube or hose 3 circumscribing an end 4 of another tube, hose, metal male part or the like.

As shown in FIG. 5, as the levers 2 are released or as the pressure forcing the levers 2 together ceases, the elasticity of the clamp is manifested. The resilient clamp springs back to return to its original position. Thus, the base or tube can be firmly held in its position around or against another article.

This self-tightening action of the elastic clamp permits dispensing with the tools usually needed to adjust a conventional clamp.

For best results, it is preferred that the diameter of the elastic clamp be slightly smaller than the diameter of the hose, tube or the like to be used.

It will be understood that each of the elements described above, or two or more together, may also find a useful application in other types of constructions differing from the types described above.

While the invention has been illustrated and described as embodied in a self-tightening elastic clamp, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A self-tightening hose clamp formed of an elastic wire having:
   a central portion formed into a continuous helix having at least two full turns of the same hand;
   end parts at each of the two ends of said helix and extending generally tangentially oppositely to each other and each having a respective outer end;
   two radially outwardly projecting grips each indirectly connected to a respective one of said outer ends, whereby displacement of said grips angularly toward each other elastically deforms said two turns so as to increase the diameter thereof; and two bent portions each connecting a respective one of said outer ends to a respective one of said grips embracing and thereby restricting axial deformation of said two turns, said bent portions each riding on said two turns during elastic deformation thereof effected through said grips.

2. The hose clamp of claim 1, said central portion having a partial turn intermediate said grips and alongside said two full turns, said partial turn having an angular length which is increasingly diminished with increasing displacement of said grips towards each other, the diminished angular length of said partial turn being merged into said two full turns so as to thereby increase the diameter of the same.

3. The hose clamp of claim 2, said two full turns contiguously contacting each other, and said partial turn at least substantially contiguously contacting one of said full turns.

4. The hose clamp of claim 1, said bent portions each having a bent arm and a bend intermediate the respective outer end and the respective bent arm, each bent arm extending from the respective bend generally spacedly back along the respective outer end.

5. The hose clamp of claim 4, said bent portion being U-shaped.

6. The hose clamp of claim 5, each respective outer end and bent arm lying against said two turns and each respective bend passing across said at least two full turns, whereby said bent portions each contact and glide on all of said full turns during the elastic deformation of said helix.

7. The hose clamp of claim 4, said grips each having a first leg projecting generally perpendicularly from the respective bent arm of the respective bent portion, a second leg and a bend intermediate the respective first and second legs, each second leg being generally parallel to and spaced from the respective first leg, whereby force applied through said grips is transmitted via said bent portions to said partial turn so as to merge same with said two full turns and thereby enlarge the diameter thereof.

8. The hose clamp of claim 7, said bend of said grip being U-shaped.

9. The hose clamp of claim 1, wherein said helix is metal and has a circular cross section.

10. The hose clamp of claim 2, wherein said outer ends of said helix are the free ends of the elastic wire, each bent portion rides on and is physically in contact with each of said two turns during elastic deformation thereof, and said central portion has a single partial turn intermediate said grips.

11. A self-tightening hose clamp of an elastic wire having:

a central portion formed into a continuous helix having two contiguous full turns of the same hand and a partial turn along and contiguous to the side of predetermined portions of both of said two full turns;

end parts at each of the two ends of said helix and extending generally tangentially from the respective two turns and oppositely to each other, each end part having a respective outer end;

a substantially U-shaped bent portion at each of said outer ends embracing said two turns, said bent portions each having a bent arm at least substantially parallel to and spaced from the respective outer end, and a bend intermediate the respective outer end and the respective bent arm and passing across said two full turns in such a manner that each bent portion rides on said turns; and radially outwardly projecting grips each having a first leg projecting generally perpendicularly from respective bent arms of said bent portions, a second leg generally parallel to and spaced from the respective first legs, and a U-shaped bend intermediate the respective first and second legs, whereby displacement of said grips angularly toward each other is transmitted to said partial turn so as to merge same with said two full turns and thereby enlarge the diameter thereof.

* * * * *